United States Patent
Jagadish et al.

[19]

[11] Patent Number: 5,915,006
[45] Date of Patent: Jun. 22, 1999

[54] TELEPHONE LINE AGGREGATED BILLING

[75] Inventors: Hosagrahar V. Jagadish; Inderpal S. Mumick, both of Berkeley Heights, N.J.

[73] Assignee: AT&T Corp., Middletown, N.J.

[21] Appl. No.: 08/848,870

[22] Filed: May 1, 1997

[51] Int. Cl.⁶ .................................................. H04M 15/00
[52] U.S. Cl. ........................... 379/127; 379/115; 379/119
[58] Field of Search ..................................... 379/112, 113, 379/114, 115, 116, 119, 120, 221, 122, 127, 133, 134

[56] References Cited

U.S. PATENT DOCUMENTS

| | | |
|---|---|---|
| 4,979,207 | 12/1990 | Baum et al. . |
| 5,146,491 | 9/1992 | Silver et al. . |
| 5,159,698 | 10/1992 | Harrington et al. ..................... 379/119 |
| 5,218,632 | 6/1993 | Cool ........................................ 379/119 |
| 5,222,125 | 6/1993 | Creswell et al. . |
| 5,291,543 | 3/1994 | Freese et al. . |
| 5,291,547 | 3/1994 | Boatwright et al. ..................... 379/119 |
| 5,333,183 | 7/1994 | Herbert ................................... 379/112 |
| 5,381,467 | 1/1995 | Rosinski et al. . |
| 5,384,831 | 1/1995 | Creswell et al. . |
| 5,450,477 | 9/1995 | Amarant et al. . |
| 5,506,893 | 4/1996 | Buscher et al. . |
| 5,544,229 | 8/1996 | Creswell et al. . |
| 5,553,131 | 9/1996 | Minervino, Jr. et al. . |
| 5,557,664 | 9/1996 | Burns et al. . |
| 5,568,541 | 10/1996 | Greene . |
| 5,577,101 | 11/1996 | Böhm . |
| 5,579,379 | 11/1996 | D'Amico et al. . |
| 5,581,607 | 12/1996 | Richardson, Jr. et al. . |
| 5,592,537 | 1/1997 | Moen . |
| 5,771,282 | 6/1998 | Friedes ................................... 379/114 |
| 5,784,443 | 7/1998 | Chapman et al. ....................... 379/116 |

*Primary Examiner*—Paul Loomis

[57] ABSTRACT

A method and system in which calls made on two or more phone lines of a customer are aggregated for billing and discount billing plans to which the customer subscribes are applied to the aggregated phone usage of the customer. In order to price a call made over a network by a customer of the network, information specifying a billing plan of the customer and information specifying a plurality of telephone lines to which the billing plan applies are stored. A call made from one of the plurality of telephone lines is received at a network switch and record that describes the call is generated. The record is received at a billing analysis system and a priced call value for the call is determined based on the record and the information specifying the customer billing plan. The record that describes the call comprises an identifier of the telephone line from which the call was made and priced call value for the call is determined by accessing the information specifying the customer billing plan using the identifier in the received record.

24 Claims, 4 Drawing Sheets

TELEPHONE LINE AGGREGATED BILLING

FIELD OF THE INVENTION

The present invention relates to the processing of telephone calls, and in particular, to the billing of the costs of such calls.

BACKGROUND OF THE INVENTION

Discount telephone billing plans have become commonplace. In a typical plan, a customer receives a discount on all calls made if total usage exceeds a predefined time or monetary limit. However, such billing plans apply separately to individual phone lines. Thus, a customer with several individual phone lines must subscribe separately to a billing plan for each line, and must qualify for any discount separately on each phone line. It would be useful if a customer could aggregate usage on two or more phone lines at the same or different addresses, so as to receive greater benefits from a discount calling plan.

SUMMARY OF THE INVENTION

The present invention is a method and system in which calls made on two or more phone lines of a customer are aggregated for billing. Thus, any discount billing plans to which the customer subscribes are applied to the aggregated phone usage of the customer.

In order to price a call made over a network by a customer of the network, according to the present invention, information specifying a billing plan of the customer and information specifying a plurality of telephone lines to which the billing plan applies are stored. A call made from one of the plurality of telephone lines is received at a network switch and a record that describes the call is generated. The record is received at a billing analysis system and a priced call value for the call is determined based on the record and the information specifying the customer billing plan. The record that describes the call comprises an identifier of the telephone line from which the call was made and the priced call value for the call is determined by accessing the information specifying the customer billing plan using the identifier in the received record.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1A:
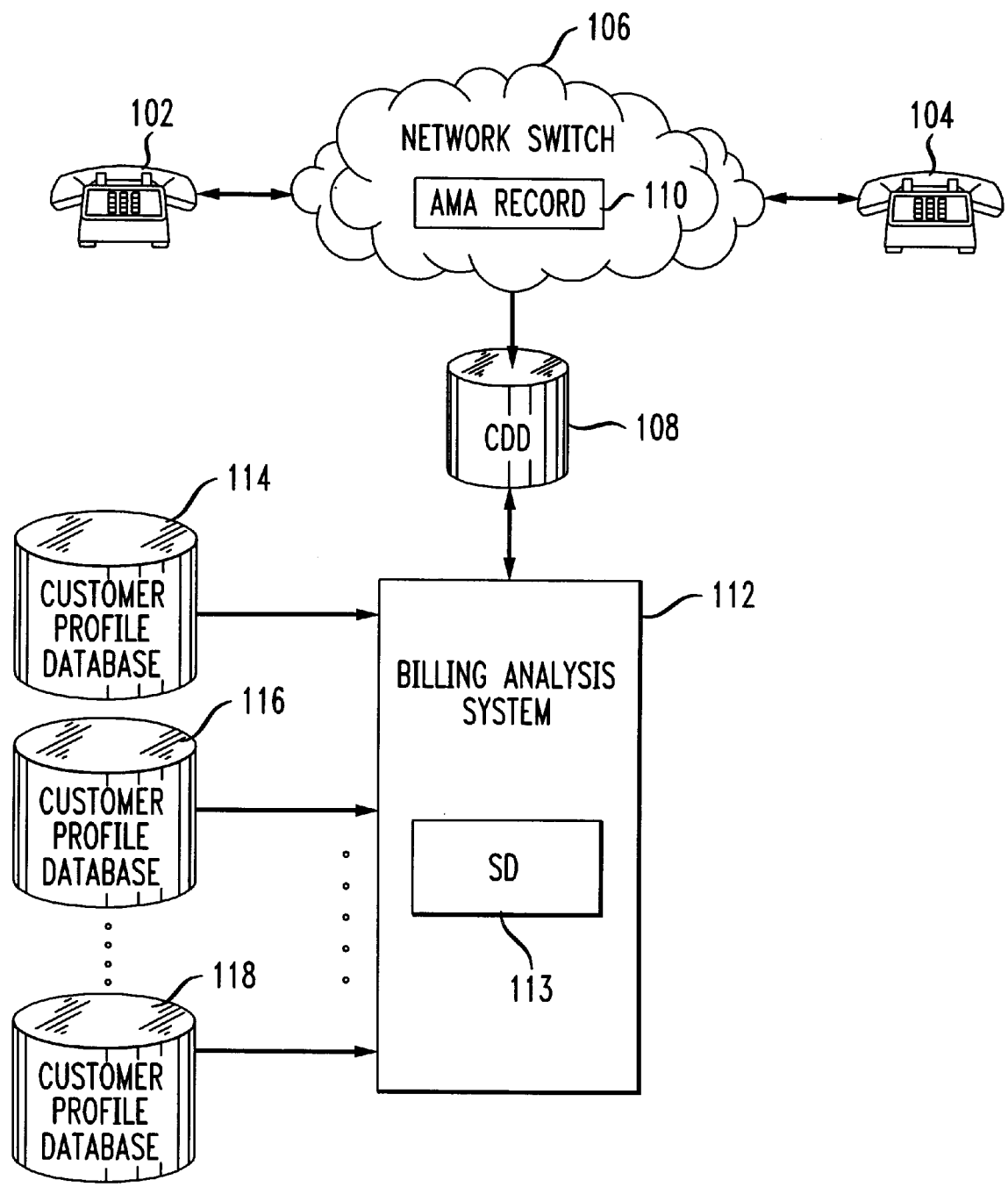
FIG. 1a is a block diagram of one embodiment a telephone call billing system, in which the present invention may be implemented.

Referring to FIG. 1a, there is shown a block diagram of a telephone system in accordance with one embodiment of the present invention. There is shown a calling telephone 102, a called telephone 104, a telephone network switch 106 and a Call Detail Database (CDD) 108. An Automatic Message Accounting (AMA) record, represented by a block 110, is also shown. As indicated by the figure, a billable call may be initiated at telephone 102 and routed through switch 106, e.g., an AT&T 4ESS® switch, to telephone 104. The switch generates AMA record 110, which includes the information necessary to rate the call. The AMA record is passed to CDD 108. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it is available for use in pricing the call. To this end, the AMA record is passed to a billing analysis system 112, which may be a general purpose computer capable of running the software necessary to implement the invention. The billing analysis system applies any customer specific billing parameters to the AMA record to produce a processed AMA record. It then passes both the AMA record and the processed AMA record back to the CDD for storage.

The billing analysis system performs its functions the instant the switch passes the AMA record to the CDD (i.e. it performs call pricing in real-time). In order to achieve real-time processing of AMA records the invention must overcome two primary obstacles. First, the customer specific data is fragmented across multiple business units, with no cohesive notion of an integrated customer profile. This situation is depicted in FIG. 1a, which shows several customer profile databases 114, 116 and 118. As shown in the figure, the invention overcomes this obstacle through the use of an integrated customer profile database located within the billing analysis system. Software tools update the integrated customer profile database in response to updates of the individual customer profiles 114, 116 and 118 so that the integrated database always contains current information on all customers.

The volume of customer and telephone call data makes it difficult to store, rate, and query call data in real-time. To surmount this obstacle the invention accumulates summary information as each individual call (AMA) record is received and rated in real-time. It is generally desirable for a telephone network to maintain a customer's current bill. Thus, one type of accumulated summary information may be current bills for each network customer. Nevertheless, it may be useful to accumulate other types of summary information for particular customers. The nature of the accumulated summary information for a particular customer depends upon the services subscribed to by that customer. For example, a customer may subscribe to a plan in which calls made during the hours between 5:00pm and 9:00am receive a 10% discount; in which case it is useful to maintain a summary field containing the number of minutes of calls that the customer has made during the discount period.

In any case, the summary information is stored in a Summary Database (SD) 113 that is located within the billing analysis system. Thus, in this embodiment, AMA records and processed AMA records are stored in the CDD, while summary information is stored in the SD. It should be noted that many alternative storage schemes may be employed without departing from the spirit of the invention. For example, in one alternative scheme, AMA records are stored in the CDD, summary information are stored in the SD, and processed AMA records are stored in both the CDD and SD.

Figure 1B:
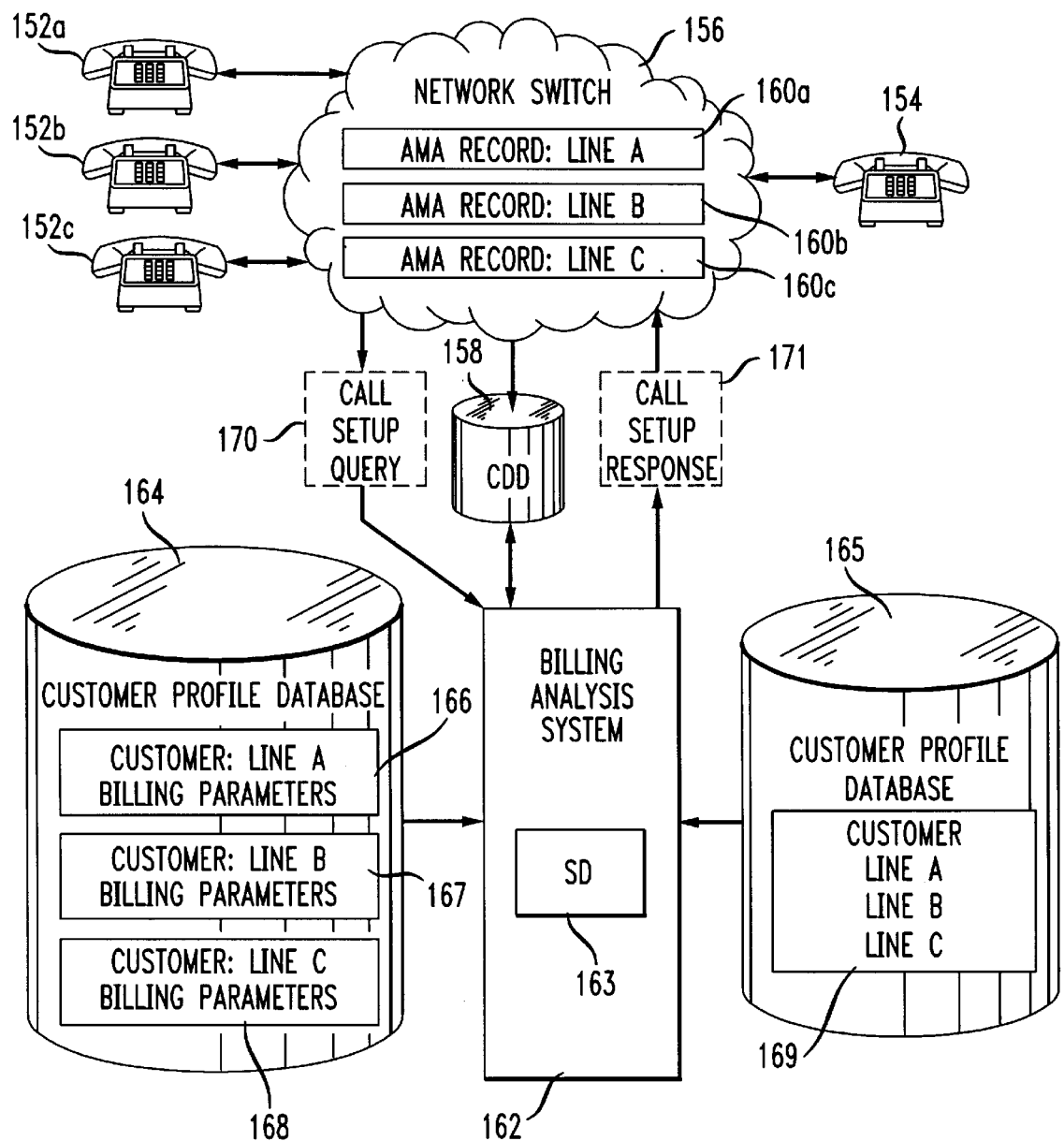
FIG. 1b is a block diagram of the telephone call billing system of FIG. 1a, showing a customer profile database according to the present invention.

The processing involved in customer group billing is shown in FIG. 1b, which, as an example, shows the present invention implemented in the telephone billing system of FIG. 1a. The present invention may be similarly implemented in the telephone billing systems shown in FIGS. 3 and 4.

A customer who has more than one telephone line, such as the telephone lines represented by telephone stations 152a–c, may place a call from any of those lines. Each call is routed through a network switch 156, which generates a corresponding AMA record 160a–c. Although in FIG. 1b multiple telephone lines are shown connected to one switch, this arrangement is only an example. The telephone lines included in the present invention may be geographically separated and connected to the same or different switches in any combination.

Each AMA record generated by a network switch, such as switch 160, includes an identifier of the customer that placed the call and the line on which the call was placed. Typically the Automatic Number Identification (ANI) is used for this purpose. In an ANI system, the number of the telephone line from which a call is initiated is determined and used to also identify the party who initiated the call. Each AMA record is passed to CDD 158, making the record available for call pricing. Each AMA record is passed from CDD 158 to billing analysis system 162, which applies the customer specific billing parameters contained in the attached customer profile database, such as database 164 or database 165.

In the embodiment of customer profile database 164, each customer has two or more customer profiles, each accessed using a different customer identifier. Each customer profile corresponds to a different telephone line that the customer has registered for participation in aggregated billing. In this example, customer profile 166 is accessed using the ANI of line A, station 152a, as the customer identifier, customer profile 167 is accessed using the ANI of line B, station 152b, as the customer identifier and customer profile 168 is accessed using the ANI of line C, station 152c, as the customer identifier.

In the embodiment of customer profile database 165, each customer has only one customer profile, but the profile may be accessed using two or more different customer identifiers. Each identifier corresponds to a different telephone line that the customer has registered for participation in aggregated billing. In this 15 example, customer profile 165 may be accessed using the ANI of either line A, B, or C, stations 152a–c, as the customer identifier.

Each customer profile includes billing parameters that indicate billing actions to be taken for that customer. The billing parameters are defined based on the customer's subscribed calling plans. For example, a customer profile may include a discount parameter indicating that the customer is to receive a discount of 10% once the customer's total usage reaches $50.00. In the embodiment of customer profile database 165, there is only one set of billing parameters that is applied to all calls made by the customer, regardless of which of the customer's lines was used to make the call. Thus, in this embodiment, a customer's subscribed calling plans are automatically applied to calls the customer makes using any line registered for participation in aggregated billing.

In the embodiment of customer profile database 164, there are two or more distinct customer profiles for each customer. Thus, it is possible for each of the customer profiles to contain different billing parameters, causing calls made using each telephone line to be priced differently. However, in the present invention, all customer profiles corresponding to each customer indicate that a common billing plan has also been chosen, based on the customer's subscribed calling plans. Thus, in this embodiment, a customer's subscribed common calling plans are also applied to calls the customer makes using any line registered for participation in aggregated billing.

In the prior art, the billing management of multiple telephone lines belonging to a single customer depended upon the local arrangement of those lines. Those telephone lines that were combined into a single local telephone account were subject to the same billing plan. There was no capability to apply different billing plans to different lines. Those telephone lines that had different accounts, whether with the same local carrier, or whether with different local carriers, were subject to separate billing plans. There was no capability to apply the same billing plan or aggregate billing.

By contrast, in the present invention, billing management for each telephone line is based on the defined customer profile for that line and may be flexibly defined as desired by the customer. For example, telephone lines that have a single local account may have different billing plans applied, by defining different billing plans the customer profile corresponding to each line. Likewise, telephone lines having different accounts may have the same billing plan applied, by defining the same billing plan in the customer profile corresponding to each line. In the present invention, telephone lines may be combined or separated in any desired arrangement, for application of billing plans.

Figure 2:
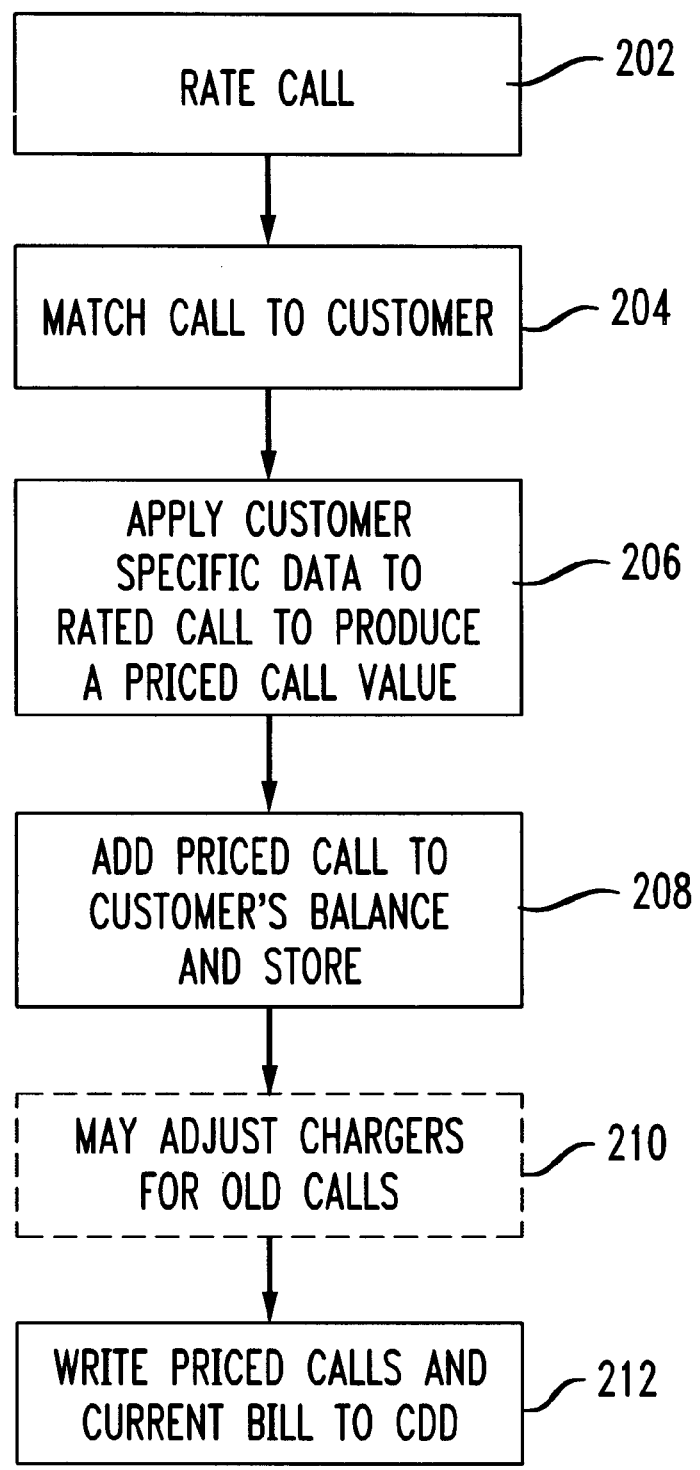
FIG. 2 is a flowchart depicting the steps involved in a procedure that a billing analysis system may use to perform customer group billing processing for each call, according to the present invention.

FIG. 2 shows, in flowchart form, a procedure that a billing analysis system may use to perform telephone line aggregated billing processing for each call. In the following description of the flowchart references will be made to the embodiment shown in FIG. 1b.

Upon receiving an AMA record, such as 160a–c from CDD 158, the first step billing analysis system 162 takes is to rate the call (step 202). It must then match the rated call to the customer (step 204) so that customer specific parameters can be applied to the call. Several well known techniques can be used to match the rated call to the customer. One such technique uses Automatic Number Identification (ANI). In an ANI system, the number of the telephone line from which a call is initiated is determined and used to also identify the party who initiated the call.

Accordingly, in the FIG. 1b embodiment, the number of a telephone line, such as the line of station 152a may be determined and passed to the billing analysis system along with the AMA record. The billing analysis system may then cross-reference the number to the customer profile containing the customer specific data to be used for the current call. For example, AMA record 160a, which relates to the line A, is cross-referenced to customer profile 166 (in the embodiment of customer profile database 164), which also relates to line A. Once the appropriate profile has been determined, the billing analysis system applies the billing parameters contained in profile 166 to the rated call to produce a priced call value (step 206). Similar processing, using the appropriate profiles, is applied to calls placed from the customer's other registered telephone lines, such as the lines of stations 152b and 152c.

The priced call value may be added to the customer's previous balance to create a new balance, or "current bill"

(step 208). Finally, the priced call value (processed AMA record) for the customer is stored in the CDD, and the current bill (summary information) for the customer is stored in the SD (step 212).

As described in relation to FIG. 1a, an alternative scheme is to store both the priced call value and current bill—collectively termed "the priced call data"—in the SD; in which case, step 212 would involve storing the priced call value and the current bill in the SD.

As an optional step in the procedure of FIG. 2, the billing analysis system may adjust charges for old calls to reflect certain types of billing plans (step 210). For example, a customer may subscribe to a plan in which the customer receives a conditional 10% discount on all calls, the condition being that the customer exceed $50.00 in total charges for a given billing period. In such a scenario, calls will initially be billed at the full rate, until such time that the customer reaches $50.00 in total charges. Thus, if the customer does reach $50.00 before the end of the billing period, not only will successive calls need to be discounted by 10%, but all previous calls will need to be discounted by 10%. This requires that prices generated for the previous calls be retroactively adjusted.

Figure 3:
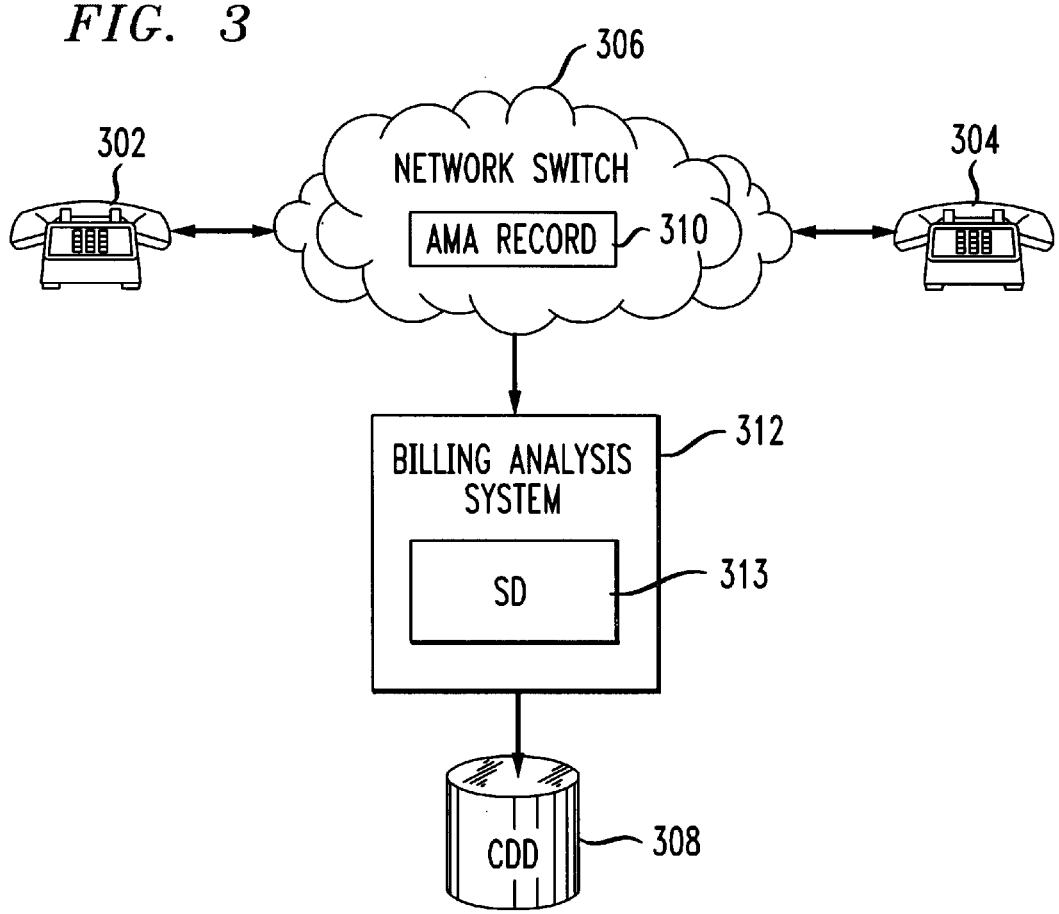
FIG. 3 is a block diagram of another embodiment a telephone call billing system, in which the present invention may be implemented.

Referring now to FIG. 3, there is shown an alternative embodiment of a telephone system in accordance with the present invention. The customer profiles are not shown, but are similar to those shown in FIG. 1b. As shown in the figure, a call may be initiated at a first telephone 302 and directed to a second telephone 304. The call is routed by a network switch 306, which generates an AMA record 310 for the call. The AMA record is passed to a billing analysis system 312 which applies customer specific parameters to the AMA record to produce a processed AMA record. The AMA record and processed AMA record are then passed to a CDD 308 for storage.

Like the billing analysis system of FIG. 1b, the billing analysis system of FIG. 3 includes a SD 313. The billing analysis system of FIG. 3 also includes an integrated customer profile—although, it should be noted that for simplicity of presentation the individual customer profile databases are not shown in FIG. 3, nor in the figures that follow. Also, like the billing analysis system of FIG. 1a, the billing analysis system of FIG. 3 accumulates summary information as each individual call record is received and rated in real-time, the summary information being stored in the SD 313. As in the prior described embodiment, alternative schemes may be employed for the storage of the AMA records, processed AMA records, and summary information.

Figure 4:
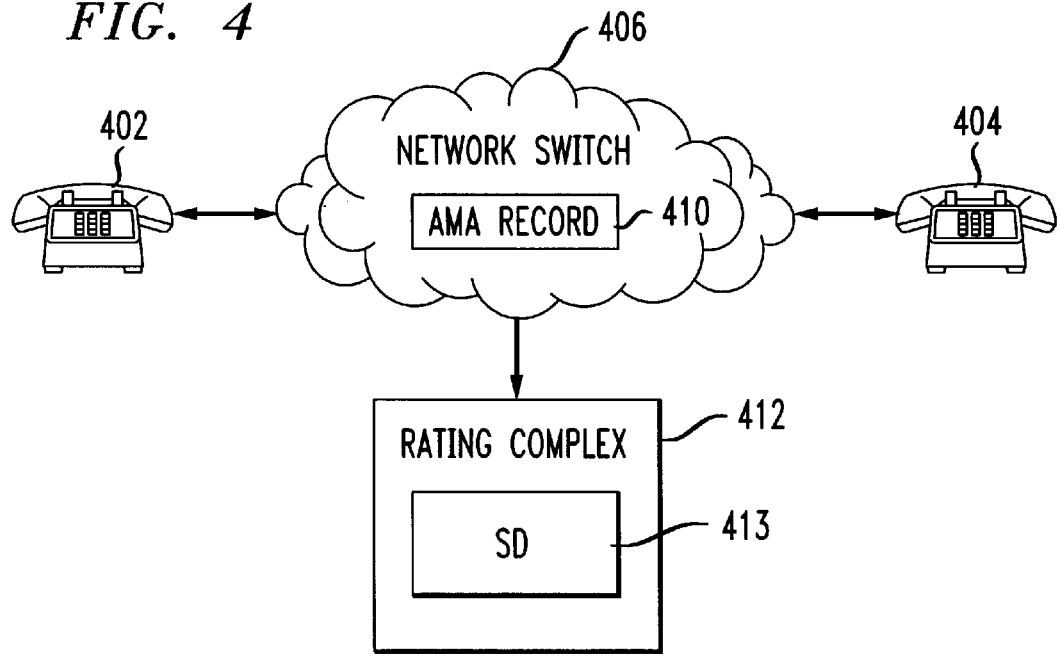
FIG. 4 is a block diagram of another embodiment a telephone call billing system, in which the present invention may be implemented.

FIG. 4 shows another embodiment of a telephone system in accordance with the present invention. The customer profiles are not shown, but are similar to those shown in FIG. 1b. In the FIG. 4 embodiment, as in the previous embodiments, a call initiated at a first telephone 402 may be directed to a second telephone 404 through a network switch 406, which generates an AMA record 410. However, in the FIG. 4 embodiment the AMA record is passed to a Rating Complex (RC) 412. The RC is a unit which performs the functions of the CDD and billing analysis system, and may therefore be characterized as a combined CDD and billing analysis system. As shown in the figure, the RC may include a SD 413 for storing the summary information separately from the AMA records and processed AMA records. As in the prior described embodiments, alternative schemes may be employed for the storage of the AMA records, processed AMA records, and summary information.

It should be noted that although all three embodiments discussed above depict a call as being initiated from a first telephone and directed to a second telephone, it is possible that calls may be initiated by, and directed to, many different types of communication devices. For example, a call may be initiated by a fax machine and directed to a personal computer. Moreover, a call may be initiated by a single communication device and directed to multiple communication devices. For example, a call may be initiated by a fax machine and directed to multiple independent personal computers. For purposes of this description, each instance of a single initiating call being directed to a different terminating device will be considered an independent call.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of pricing a call made over a network by a customer of the network, comprising the steps of:
   storing information specifying a billing plan of the customer and information specifying a plurality of telephone lines to which the billing plan applies, each telephone line having a separate billing account;
   receiving a call made from one of the plurality of telephone lines at a network switch;
   generating a record that describes the call;
   receiving the record at a billing analysis system; and
   determining a priced call value for the call based on the record, information specifying the customer billing plan and aggregated information relating to all of the plurality of separate billing accounts.

2. The method of claim 1, wherein the record that describes the call comprises an identifier of the telephone line from which the call was made and the determining step comprises the step of:
   accessing the information specifying the customer billing plan using the identifier in the received record.

3. The method of claim 3, further comprising the step of:
   updating the customer's current bill by adding the priced call value to the customer's balance.

4. The method of claim 3, wherein the priced call value incorporates one or more discounts to which the customer is entitled.

5. The method of claim 1, wherein at least one of the telephone lines is geographically separate from the other telephone lines.

6. The method of claim 1, wherein each telephone line is coupled to a network switch and all telephone lines are coupled to the same network switch.

7. The method of claim 1, wherein each telephone line is coupled to one of a plurality of network switches and at least some of the telephone lines are coupled to different network switches.

8. The method of claim 1, further comprising the step of:
   generating a separate bill for each separate billing account.

9. A system for pricing a call made over a network by a customer of the network, comprising the steps of:
   a database storing information specifying a billing plan of the customer and information specifying a plurality of telephone lines to which the billing plan applies, each telephone line having a separate billing account;
   a network switch receiving a call made from one of the plurality of telephone lines and generating a record that describes the call; and a billing analysis system receiving the record and determining a priced call value for the call based on the record and the information specifying the customer billing plan and aggregated information relating to all of the plurality of separate billing accounts.

10. The system of claim 9, wherein the record that describes the call comprises an identifier of the telephone line from which the call was made and the billing analysis system further:

accesses the information specifying the customer billing plan using the identifier in the received record.

11. The system of claim 10, wherein the billing analysis system further:

updates the customer's current bill by adding the priced call value to the customer's balance.

12. The system of claim 11, wherein the priced call value incorporates one or more discounts to which the customer is entitled.

13. The method of claim 9, wherein at least one of the telephone lines is geographically separate from the other telephone lines.

14. The method of claim 9, wherein each telephone line is coupled to a network switch and all telephone lines are coupled to the same network switch.

15. The method of claim 9, wherein each telephone line is coupled to one of a plurality of network switches and at least some of the telephone lines are coupled to different network switches.

16. The method of claim 9, wherein the billing analysis system further generates a separate bill for each separate billing account.

17. A system for pricing a call made over a network by a customer of the network, comprising:

means for storing information specifying a billing plan of the customer and information specifying a plurality of telephone lines to which the billing plan applies, each telephone line having a separate billing account;

means for receiving a call made from one of the plurality of telephone lines;

means for generating a record that describes the call; and means for determining a priced call value for the call based on the record and the information specifying the customer billing plan and aggregated information relating to all of the plurality of separate billing accounts.

18. The system of claim 17, wherein the record that describes the call comprises an identifier of the telephone line from which the call was made and the determining means comprises:

means for accessing the information specifying the customer billing plan using the identifier in the received record.

19. The system of claim 18, further comprising:

means for updating the customer's current bill by adding the priced call value to the customer's balance.

20. The system of claim 19, wherein the priced call value incorporates one or more discounts to which the customer is entitled.

21. The method of claim 17, wherein at least one of the telephone lines is geographically separate from the other telephone lines.

22. The method of claim 17, wherein each telephone line is coupled to a network switch and all telephone lines are coupled to the same network switch.

23. The method of claim 17, wherein each telephone line is coupled to one of a plurality of network switches and at least some of the telephone lines are coupled to different network switches.

24. The method of claim 15, further comprising:

means for generating a separate bill for each separate billing account.

* * * * *